US005558882A

United States Patent [19]
Ulmer

[11] Patent Number: 5,558,882
[45] Date of Patent: Sep. 24, 1996

[54] PIPE PAVER FINISHING MACHINE

[75] Inventor: Ewald R. Ulmer, Canton, S. Dak.

[73] Assignee: CMI Corproration, Oklahoma, Okla.

[21] Appl. No.: 327,017

[22] Filed: Oct. 21, 1994

[51] Int. Cl.6 .............................. E02D 29/00; B05C 7/06; B28B 19/00
[52] U.S. Cl. ........................ 425/11; 405/150.1; 425/427; 425/460
[58] Field of Search ................................. 405/150.1, 268; 425/11,63, 150, 427, 460

[56] References Cited

U.S. PATENT DOCUMENTS 2,176,891 10/1939 Crom ....................................... 405/268
3,597,932 8/1971 Sebastian ................................. 405/268
4,699,543 10/1987 Mio et al. ................................ 405/268
5,059,067 10/1991 McCoy .................................... 405/268

*Primary Examiner*—James P. Mackey
*Attorney, Agent, or Firm*—Emrich & Dithmar

[57] ABSTRACT

A pipe paver finishing machine is disclosed for applying and finishing concrete lining onto the interior surface of a lower segment portion of a drainage pipe. The machine includes a chassis member adapted for movement longitudinally along the interior of the drainage pipe and a surfacing unit suspended from the chassis member and adapted for a pendulum-type pivotal movement substantially about the center point of drainage pipe to apply and to finish a concrete liner onto the bottom interior surface of the drainage pipe.

12 Claims, 10 Drawing Sheets

PIPE PAVER FINISHING MACHINE

BACKGROUND OF THE INVENTION

The present invention relates to a pipe paver finishing machine for use in applying a concrete liner to the lower surface segment of pipe or culverts, and more particularly, to a pipe paver finishing machine which is adjustable to apply a concrete liner to various diameter pipes or culverts.

At the present time, there exist street or drainage pipes, conduits or culverts that are in need of repair. These existing drainage pipes or culverts are generally fabricated of corrugated steel sections and have inside diameters ranging between about 8 to 12 feet in diameter. These pipes, conduits or culverts have been subjected to erosion and to corrosion which results in such pipes being worn through at the bottom thereof, resulting in excessive leakage. It is desirable to repair such worn out pipes, conduit or culverts by applying a concrete liner section over the bottom segment of the pipe circumference to repair the pipe or culvert to perform their intended function of drainage.

In the past, such repairs have been accomplished by depositing concrete to the bottom of the pipe and to manually level the concrete to provide a liner over the lower segment portion of the pipe circumference. However, such manual finishing results in an uneven concrete grade height of the concrete liner over the lower segment of the pipe circumference, and results in higher material and labor costs and a liner which is unsatisfactory and inoperable due to the uneven concrete grade.

SUMMARY OF THE INVENTION

It is one object of the present invention to provide a pipe paver finishing machine which levels and grades a concrete liner upon a bottom segment portion of a drainage pipe.

It is another object of the present invention to provide a pipe paver finishing machine for applying a concrete liner uniformly over the interior surface of a lower segment portion of a drainage pipe which includes a chassis-frame member adapted for movement longitudinally along the interior of the drainage pipe and a surfacing unit suspended from the chassis-frame member and adapted for a back and forth pendulum-type pivotal movement substantially about the center point of the drainage pipe.

It is an object of the present invention to provide a concrete finishing machine for use in drainage pipes, conduits or culverts which includes adjustable telescoping frame support members and an adjustable pendulum-type leveling and finishing unit assembly suspended therefrom which can travel longitudinally along the interior length of the drainage pipe or culvert to provide a uniform finished grade height to the concrete liner over the bottom segment portion of the drainage pipe circumference.

It is a further object of the present invention to provide a novel method of applying and finishing a concrete liner to a bottom segment portion of a drainage pipe.

The present invention provides a concrete finishing machine embodying an elongated frame member or chassis adapted for movement on rollers or bogies longitudinally along the interior surface of a drainage pipe or conduit on rails that are mounted along the inside surface of the pipe or conduit. The concrete finishing machine includes a surfacing or finishing unit mounted to elongated frame members or chassis, which unit is adapted for a pivotal pendulum movement back and forth with respect to the frame members as the frame members move along the length of the drainage pipe. The finishing unit includes a support frame which mounts and supports a pair of finishing rollers and a pair of augers engageable with the concrete surface to be finished. The finishing rollers are centered over the concrete being finished to set the grade for the concrete liner within the drainage pipe or conduit. The augers of the finishing unit are carried on shafts which extend axially forwardly of the finishing rollers in a substantially horizontal plane to draw the concrete towards the space between the augers as well as longitudinally outwardly along the augers away from the finishing rollers to turn the concrete to grade prior to finishing by the finishing rollers. The pivot point of the surfacing unit is located on the center point of the drainage pipe to insure a uniform finished grade height of the concrete liner over the bottom segment portion of the drainage pipe circumference.

The movable pendulum-type finishing unit is adjustable vertically to maintain the pendulum-type pivot point on the center of the drainage pipe to accommodate various diameter sized drainage pipes or conduits and the elongated frame members or chassis of the concrete finishing machine are laterally adjustable to adjust the width of the machine to accommodate various diameter sized pipes or conduits. Thus, in accordance with the present invention, it has been found that a concrete finishing machine may be made adjustable to accommodate various sized drainage pipes or culverts between approximately 8 to 12 feet in diameter.

It has been found that the pivot point for the pendulum suspended finishing unit is, preferably, located on the center point of the particular drainage pipe or conduit as the concrete finishing machine travels longitudinally along the drainage pipe. The suspended finishing unit is structurally arranged to apply and grade a concrete lining to approximately the lower 75 to 125 degrees segment of the conduit circumference, as desired. Preferably, about a 90 degree segment of concrete lining is applied to the bottom of the drainage pipe.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating and understanding the present invention, there is illustrated in the accompanying drawings a preferred embodiment thereof, from an inspection of which, when considered in connection with the following description, the invention, its construction and operation, and many of its advantages will be readily understood and appreciated.

DESCRIPTION OF A PREFERRED EMBODIMENT

Figure 1:
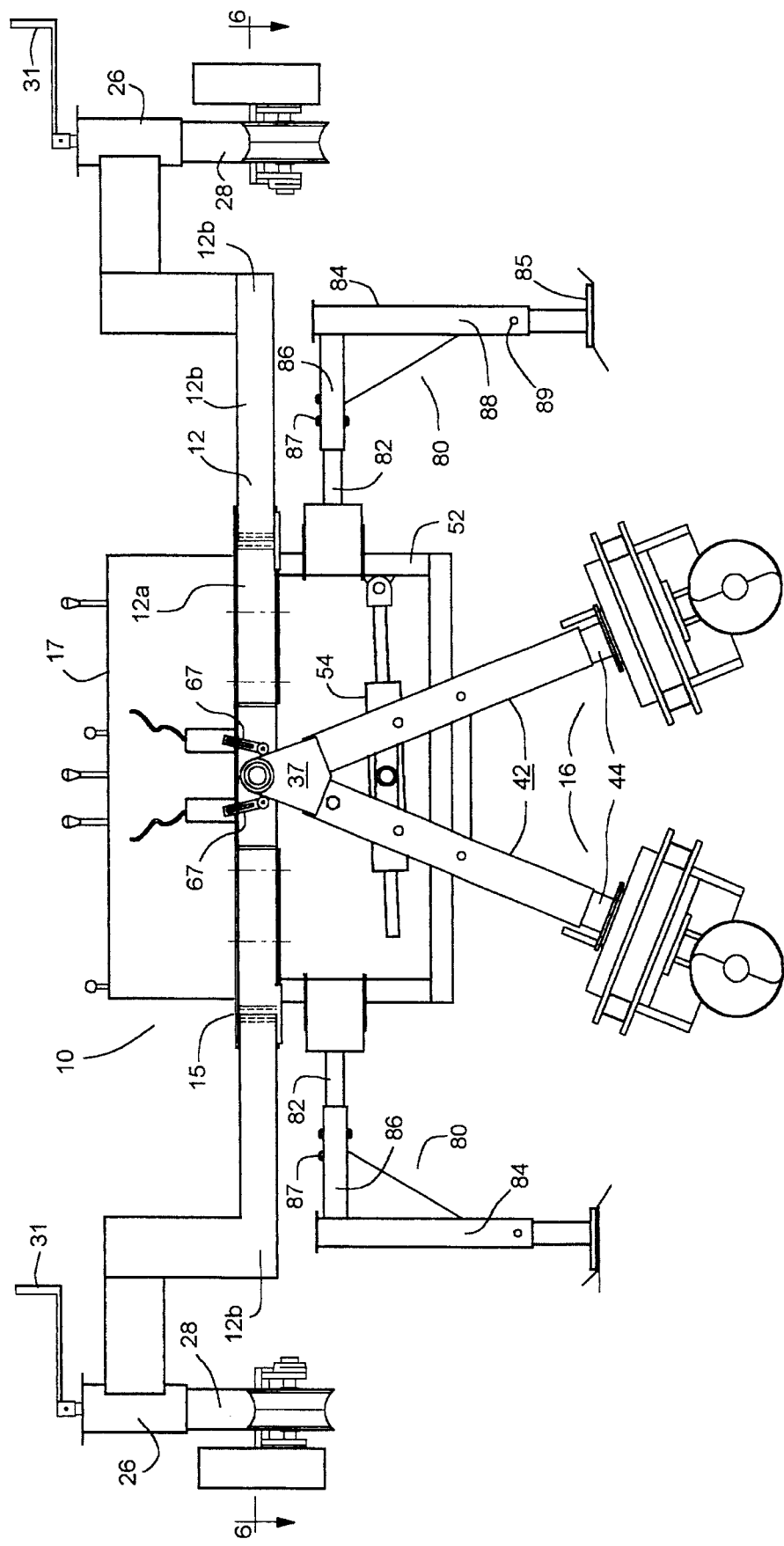
FIG. 1, is a front elevational view of a concrete leveling machine embodying the principles of the present invention.

A pipe paver or concrete leveling machine, embodying the principles of the present invention, is shown in the drawings to illustrate the preferred embodiment of the present invention. The concrete leveling machine 10 is shown in FIGS. 1–7 and is disposed in an operative position within a drainage pipe, conduit or culvert 14, as illustrated in FIG. 2.

Figure 6:
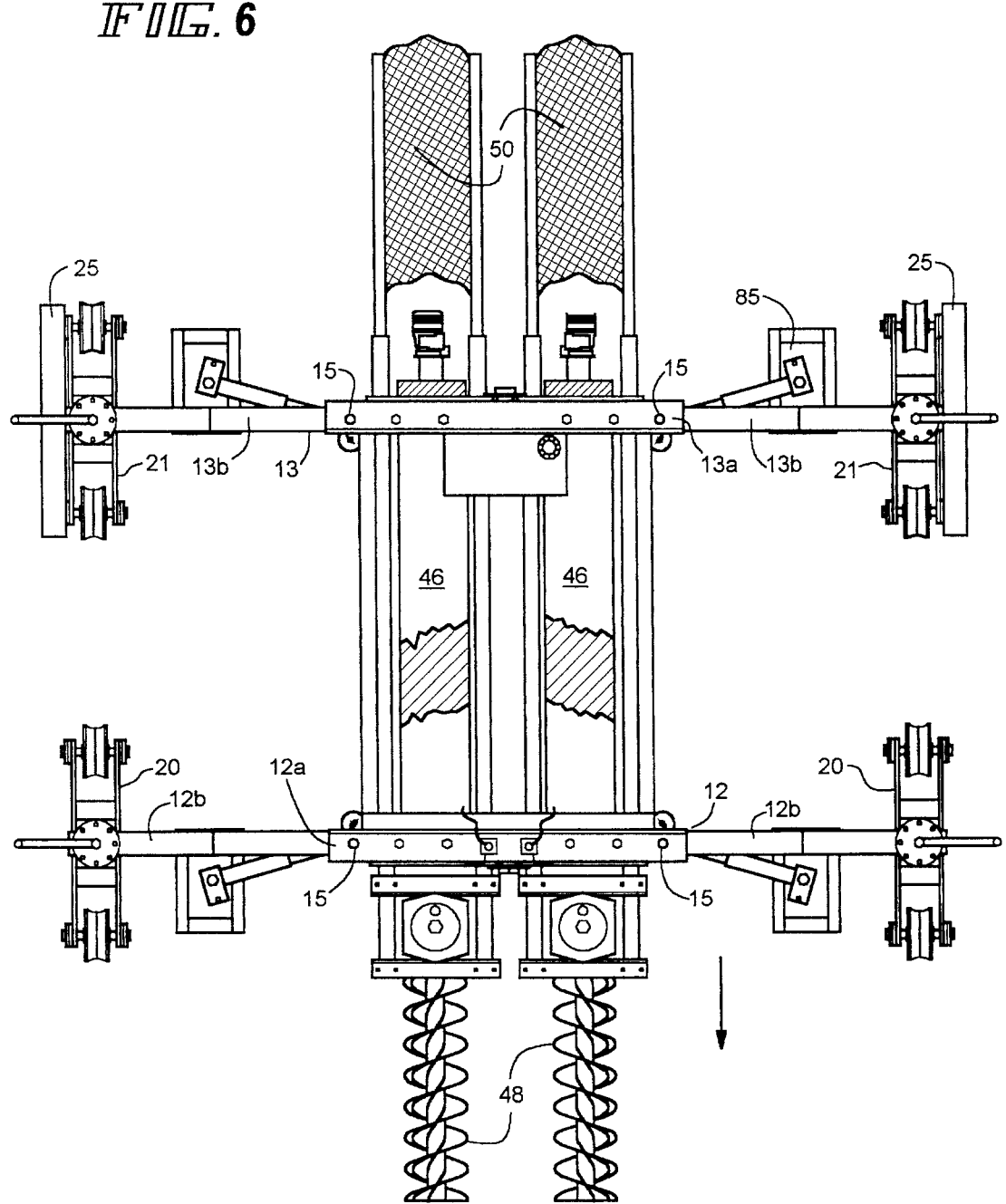
FIG. 6, is a view taken along lines 6—6 in FIG. 1.
Figure 7:
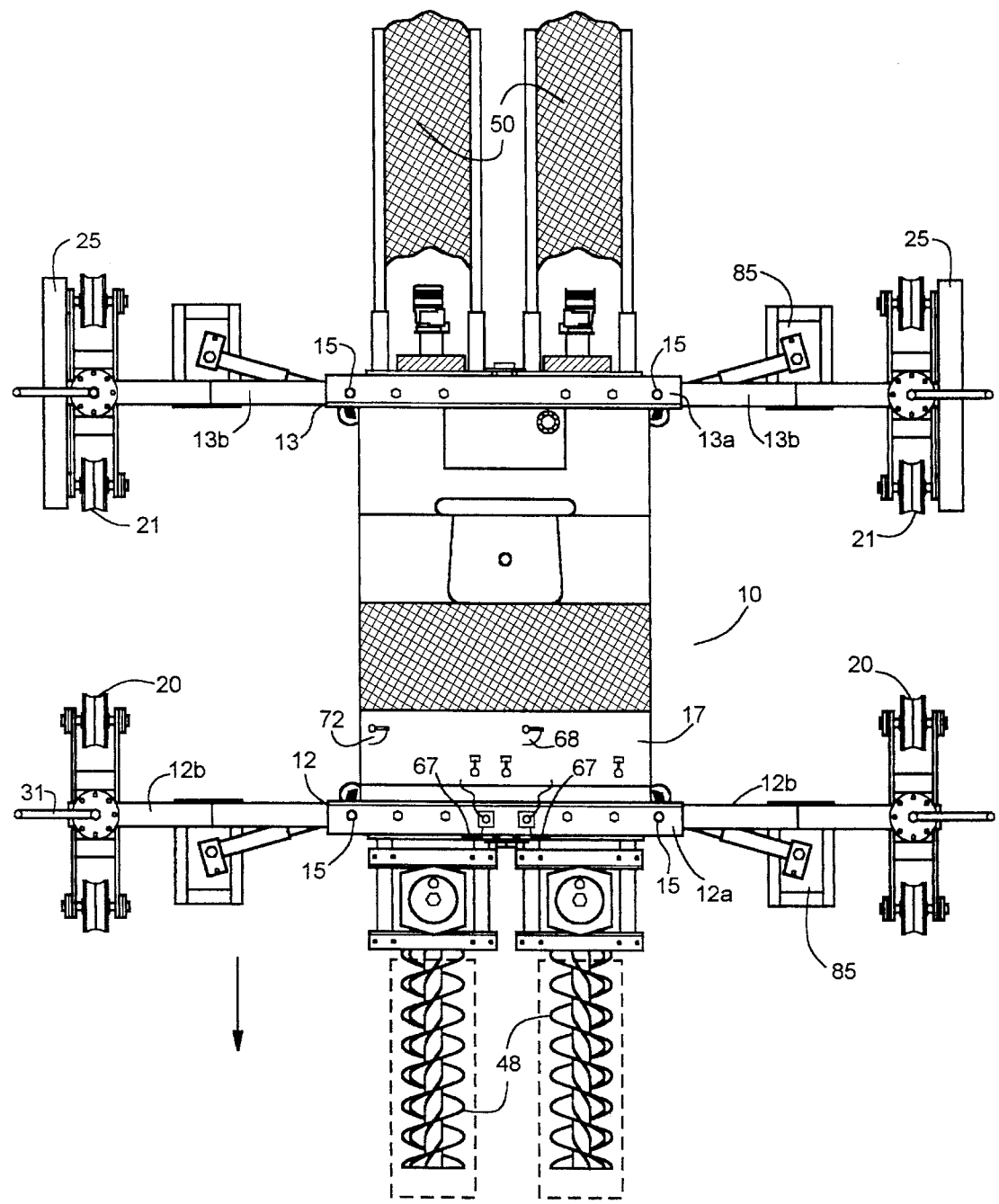
FIG. 7, is a top plan view of a concrete leveling machine in accordance with the present invention.

The concrete leveling machine 10 includes a chassis 11 including a pair of elongated frame members 12 and 13 on which is mounted a finishing or surfacing unit 16 which is pivotally moveable in a pendulum-type motion with respect to the elongated frame members 12 and 13. The elongated frame members 12 and 13 are comprised of enlarged central frame members or portions 12a and 13a, respectively, and telescoping adjustable end extension members or portions 12b and 13b, respectively. As illustrated in FIGS. 6 and 7, the central frame members 12a and 13a, preferably are substantially parallel to one another and in the same plane, with the front frame member being identified as 12. As shown in FIGS. 3 and 7, a control console 17 is mounted as a bridge between the elongated frame members 12 and 13 from which an operator may control operation of the concrete leveling machine 10, as will hereinafter be described. The elongated frame members 12 and 13 are adapted to extend transversely across the interior surface of the drainage pipe 14 and the concrete leveling machine is adapted to move lengthwise of the drainage pipe in a direction transverse to the length of the frame members 12 and 13. As shown in FIG. 2, horizontally extending support rails 19 are mounted on opposite interior sides of the drainage pipe 14 and extend lengthwise of the drainage pipe to be finished. The upper edges of the support rails 19 are adapted to operatively receive a pair of front bogies 20 and a pair of rear bogies 21 mounted on opposite ends of the elongated frame members 12 and 13, respectively, to permit the concrete leveling machine 10 to be moved along the support rails 19. As shown in FIG. 2, the support rails 19 are mounted and retained by a yoke member 22 which is positioned and held by a bracket member 24 secured to the inside wall surface of the drainage pipe 14. The front pair of bogies 20 idle and the rear pair of bogies 21 are driven by tractive drive motors 25 such that the concrete leveling machine 10 is self-propelled and moves by the power of its own tractive wheels, in a slow, creeping motion, as controlled by the operator, as shown by the direction of the arrow in FIGS. 3, 6 and 7.

Each of the elongated frame members 12 and 13 include a central enlarged tubular members or portions 12a and 13a, respectively, that are adapted to receive at each end thereof telescoping adjustable end extension members 12b and 13b, respectively, that are axially positioned therein (FIGS. 6 and 7). The telescoping adjustable end extension members 12b and 13b are adjustably mounted by bolts 15 to the central enlarged tubular portions 12a and 13a to provide the width adjustment of the concrete finishing machine to accommodate various diameter sizes of pipes or conduits.

The outer ends of each of the telescoping adjustable end extension members 12a and 13b are mounted to an outer tubular sleeve member 26. A vertical adjustment mechanism 27 is provided on the leveling machine 10 and includes an elongated inner cylindrical jack member 28 having a feed screw 29 threadedly mounted therein, with the feed screw 29 being secured to the inner jack member 28 by a nut member 30 (shown in dotted lines in FIG. 3). The inner cylindrical jack member 28 is slidably positioned within the outer tubular sleeve member 26. The lower end of the inner jack member 28 is secured to the respective front and rear bogies 20 and 21 and a hand crank 31 is secured to the upper end portion of the feed screw 29 on the outside surface of the end of outer sleeve member 27. Rotation of the hand crank 31 on each of the corners of the chassis rotates the feed screw 29 within the inner jack member to thereby finely vertically move and adjust the inner jack members and the elongated frame members 12 and 13 with respect to the bogies on the support rails 19 to provide a fine vertical adjustment means for the concrete leveling machine. By this fine adjustment means or mechanism, the pivot point of the central pendulum-type frame may be finely adjusted vertically to insure that the pivot point is maintained at the center of the drainage pipe.

As pointed out previously, the telescoping adjustable end extension members 12b and 13b are secured by bolts 15 to the central enlarged portions 12a and 13a, respectively, as desired to permit width adjustment of the concrete finishing machine to accommodate various diameter sized drainage pipes to insure that the pivot point of the central tubular pendulum frame is positioned at the center of the drainage pipe.

Figure 8:
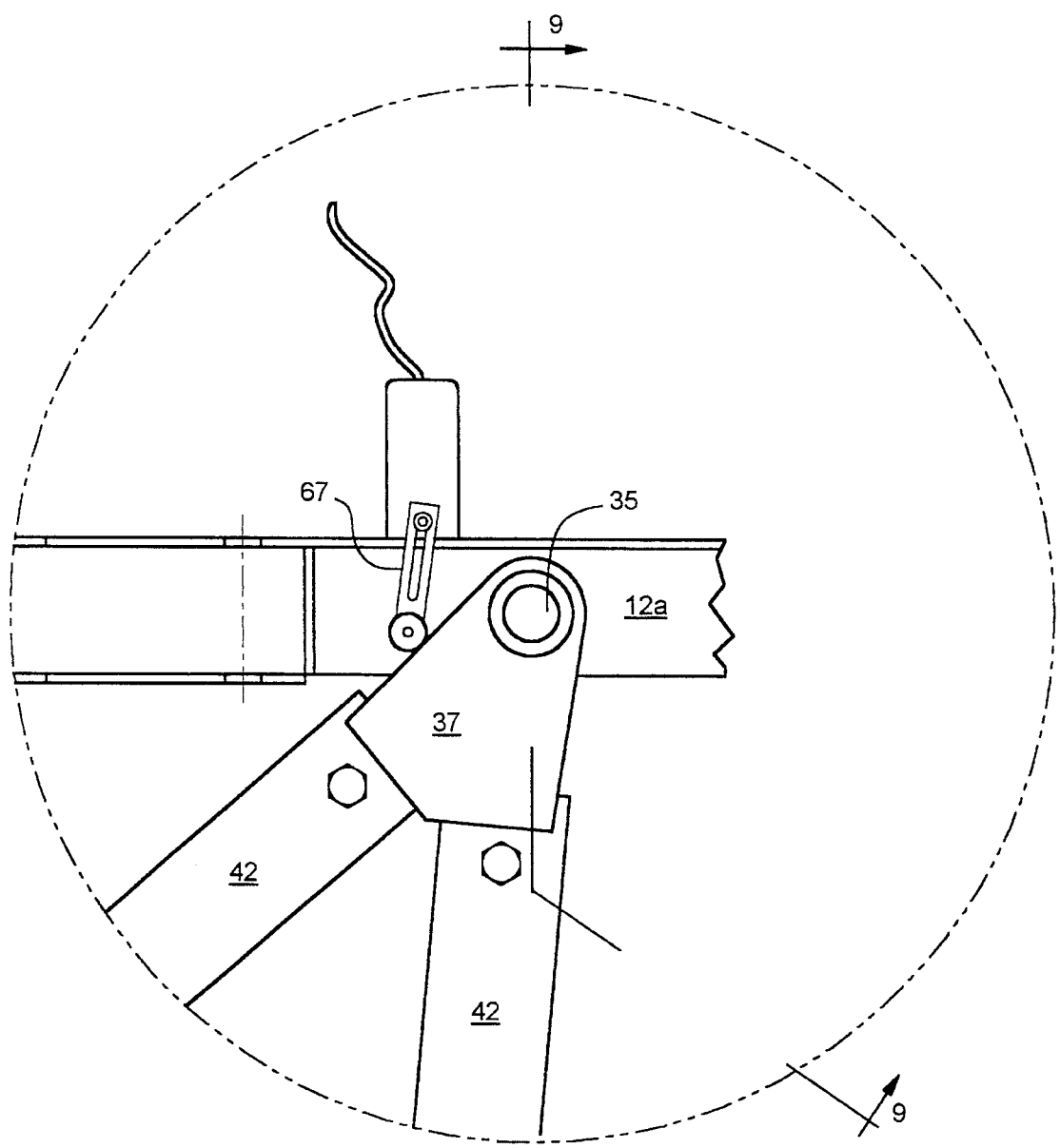
FIG. 8, is an enlarged frontal view of the central tubular pendulum frame means in accordance with the present invention.
Figure 9:
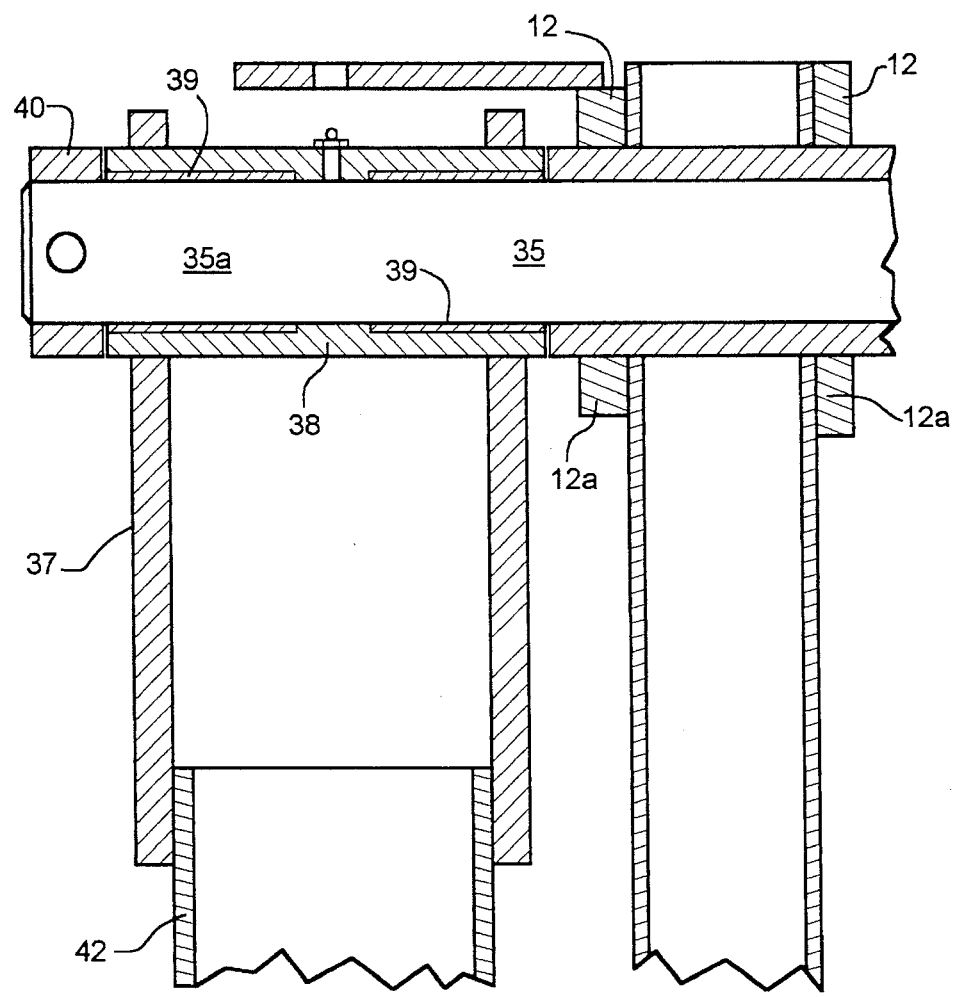
FIG. 9, is a sectional view of the mounting of the central tubular pendulum frame means to the frame member of the concrete leveling machine taken along lines 9—9 in FIG. 8 in accordance with the present invention.

As illustrated in FIGS. 1–7, the concrete finishing or surfacing unit 16 is suspended from an adjustable pendulum structure means or mechanism comprised of a elongated central tubular pendulum shaft 35, extending through and supported by the central enlarged frame members 12a and 13a, respectively. As shown in FIGS. 8–9, the pendulum shaft 35 is fixedly mounted to and extends through and between the central enlarged frame members 12a and 13a, with a forward end 35a and a rearward end (only the forward end 35a is shown in FIG. 9) projecting forwardly and rearwardly of the frame members 12 and 13. A pair of bracket support members 37 are mounted to the projecting ends of the central tubular pendulum shaft 35. The bracket support members 37 include a sleeve portion 38 which is slidably engageable onto the end 35a of the shaft 35 to permit the support members 37 to pivotally move with respect to the end of the shaft. Sleeve bearings 39 are provided between the shaft 35 and the sleeve portion 38 to permit and to facilitate the pivotal movement of the support members 37 with respect to the shaft end 35a. A retaining ring 40 secures the support members onto the end 35a of the shaft 35.

Attached to the bracket support members 35 are a pair of outer support tubes 42 which extend downwardly therefrom in substantially a V-shaped configuration. The outer support tubes 42 are adapted to telescopically receive and mount, by bolts 43, inner adjustable support tubes 44 which are each attached to elongated finishing unit frame members 45. The frame members 45 (FIG. 3) provide support for the substantially horizontally extending elongated concrete smoothing members or cylinders 46 journalled in and suspended from the frame members 45.

As shown in FIGS. 3, 6 and 7, extending forwardly of each of the concrete smoothing cylinder members 46 is an auger 48 in substantially horizontally spaced relation to each other. The augers 48 and guard 48*a* are structurally arranged such that rotation of the double flighted augers during the operation of the concrete leveling machine 10 are effective to engage the concrete to move the concrete towards the space between the augers 48 and longitudinally away from the cylinders 46 to permit the cylinders 46 to finish the concrete and to provide the desired concrete lining on the interior bottom portion of the drainage pipe 14, as shown in FIG. 2. The finishing or surfacing unit 16, preferably, may include texturing drag means 50 extending rearwardly therefrom to facilitate texturing and finishing of the concrete lining 10*a* (FIG. 2) within the interior bottom surface of the drainage pipe 14.

Figure 2:
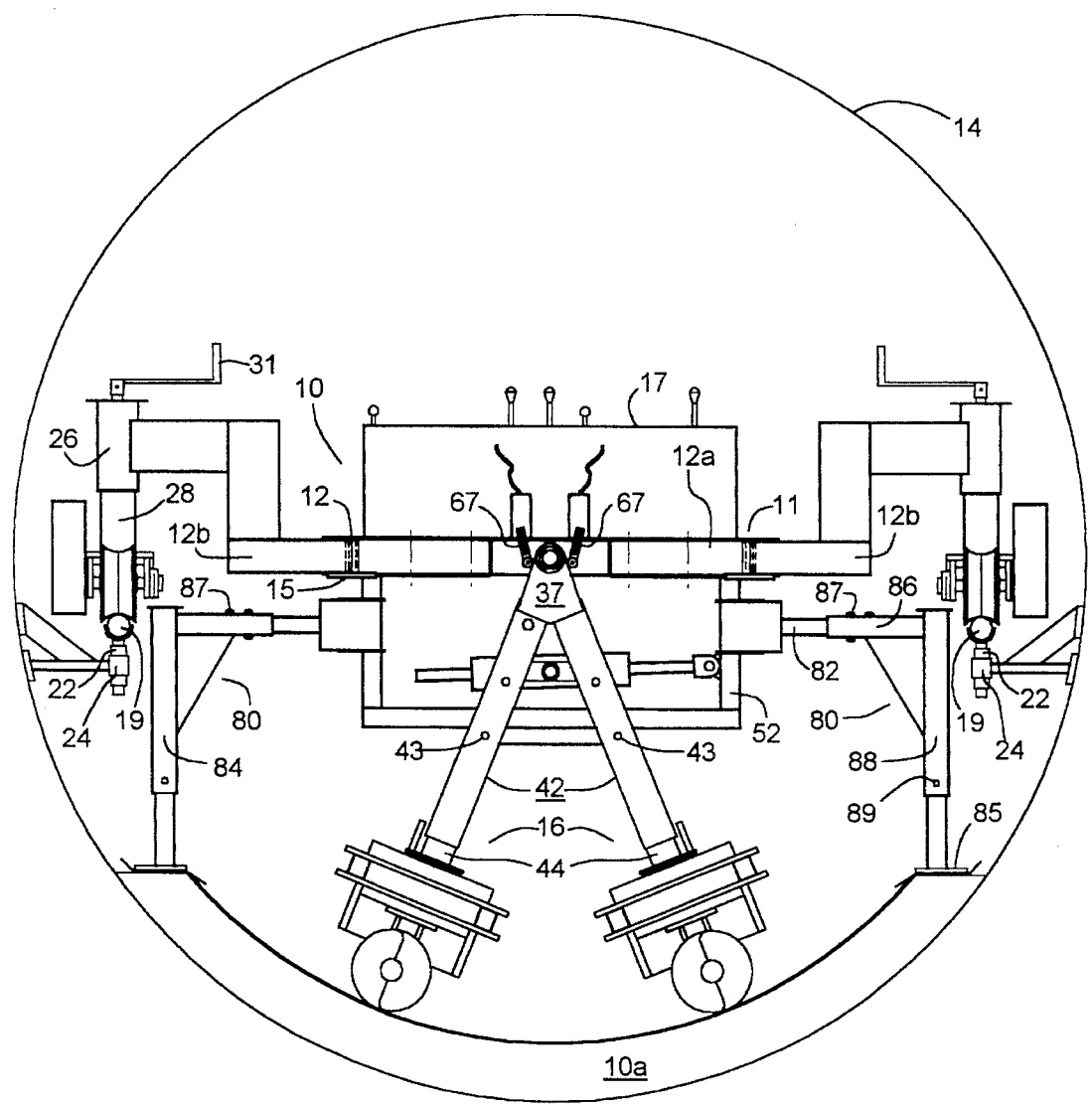
FIG. 2, is a front elevational view similar to FIG. 1, but showing the concrete leveling machine disposed within a drainage pipe.
Figure 3:
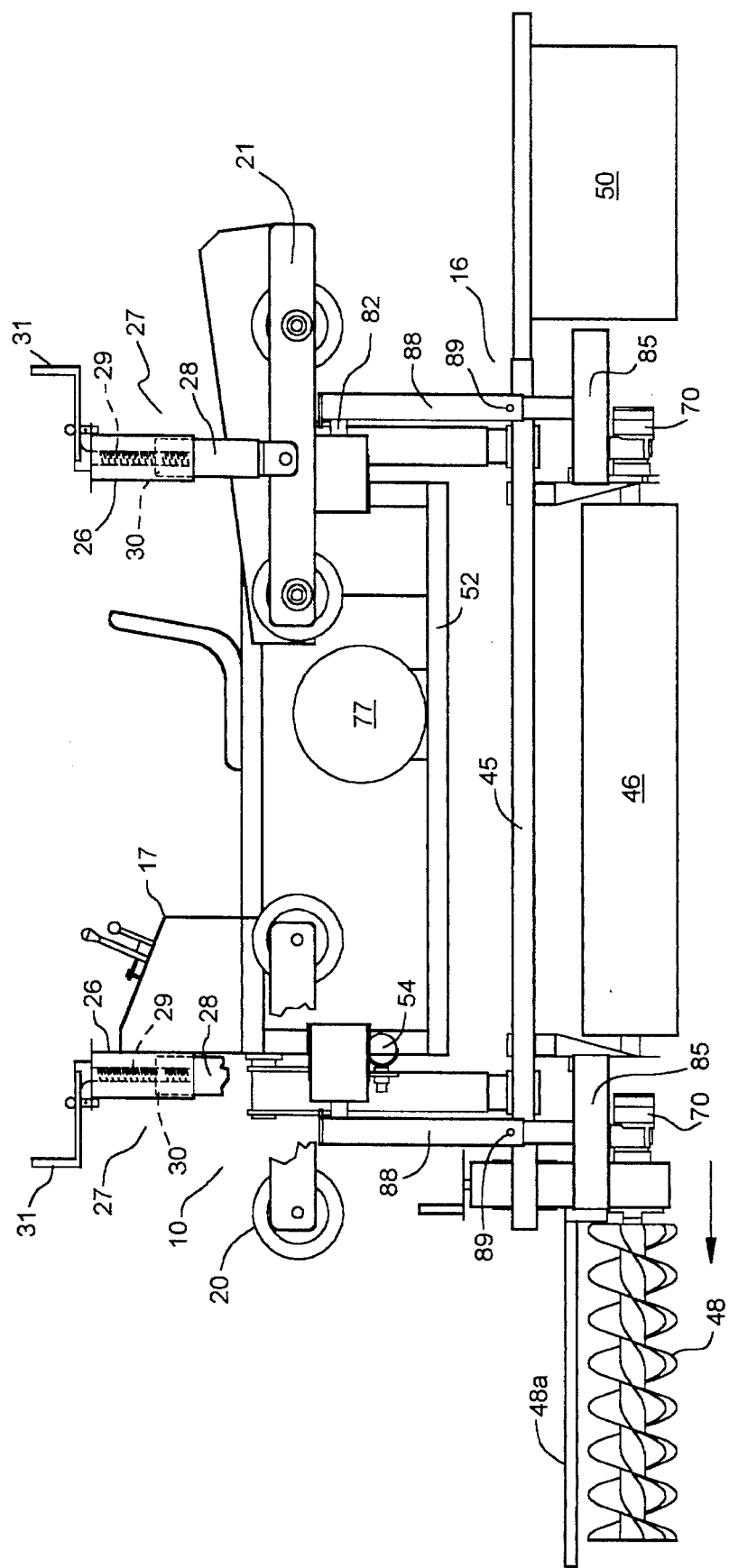
FIG. 3, is side elevational view of the concrete leveling machine as shown in FIG. 1.
Figure 4:
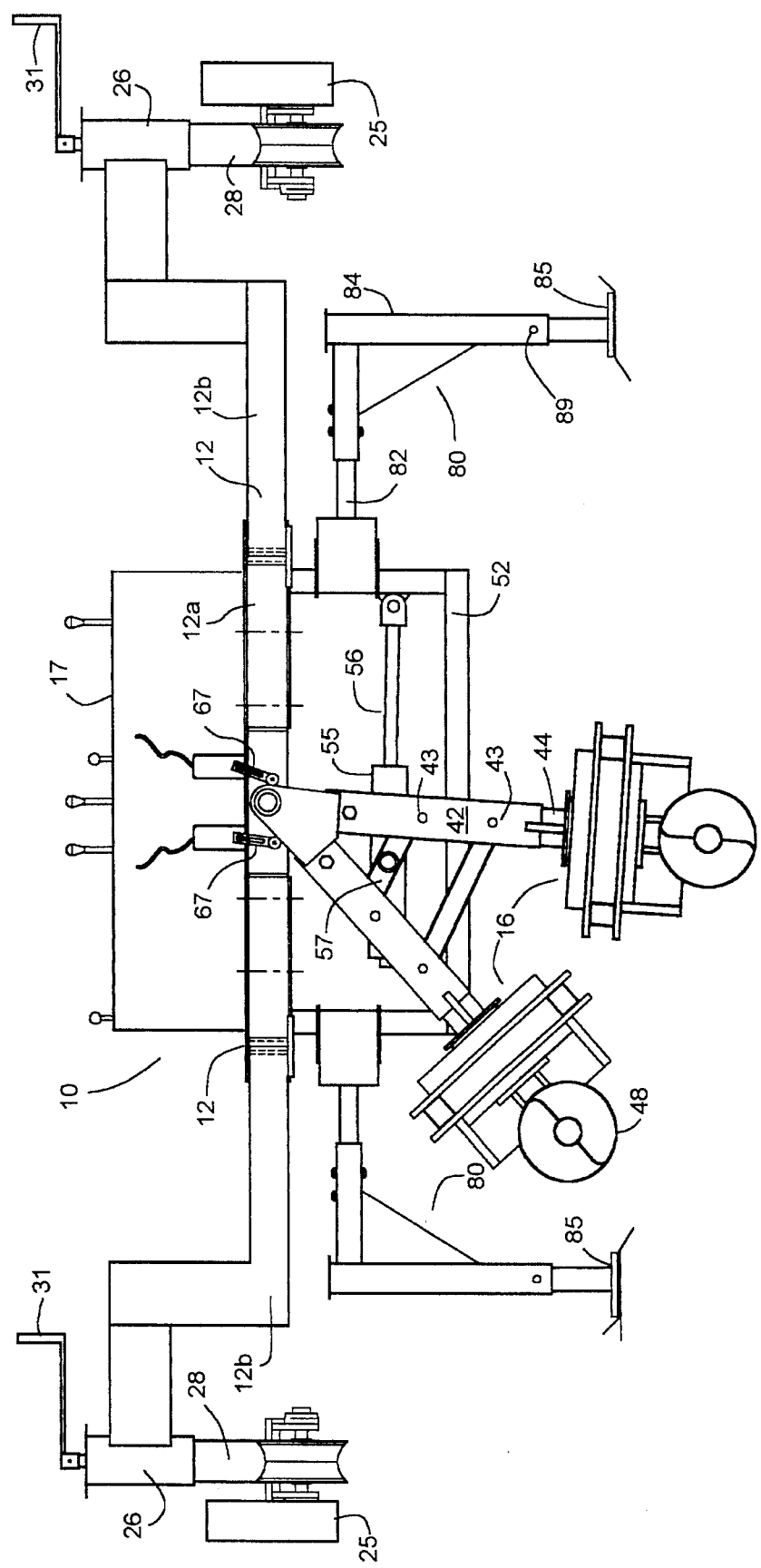
FIG. 4, is a view similar to FIG. 1 but showing certain parts disposed in different operative positions.
Figure 5:
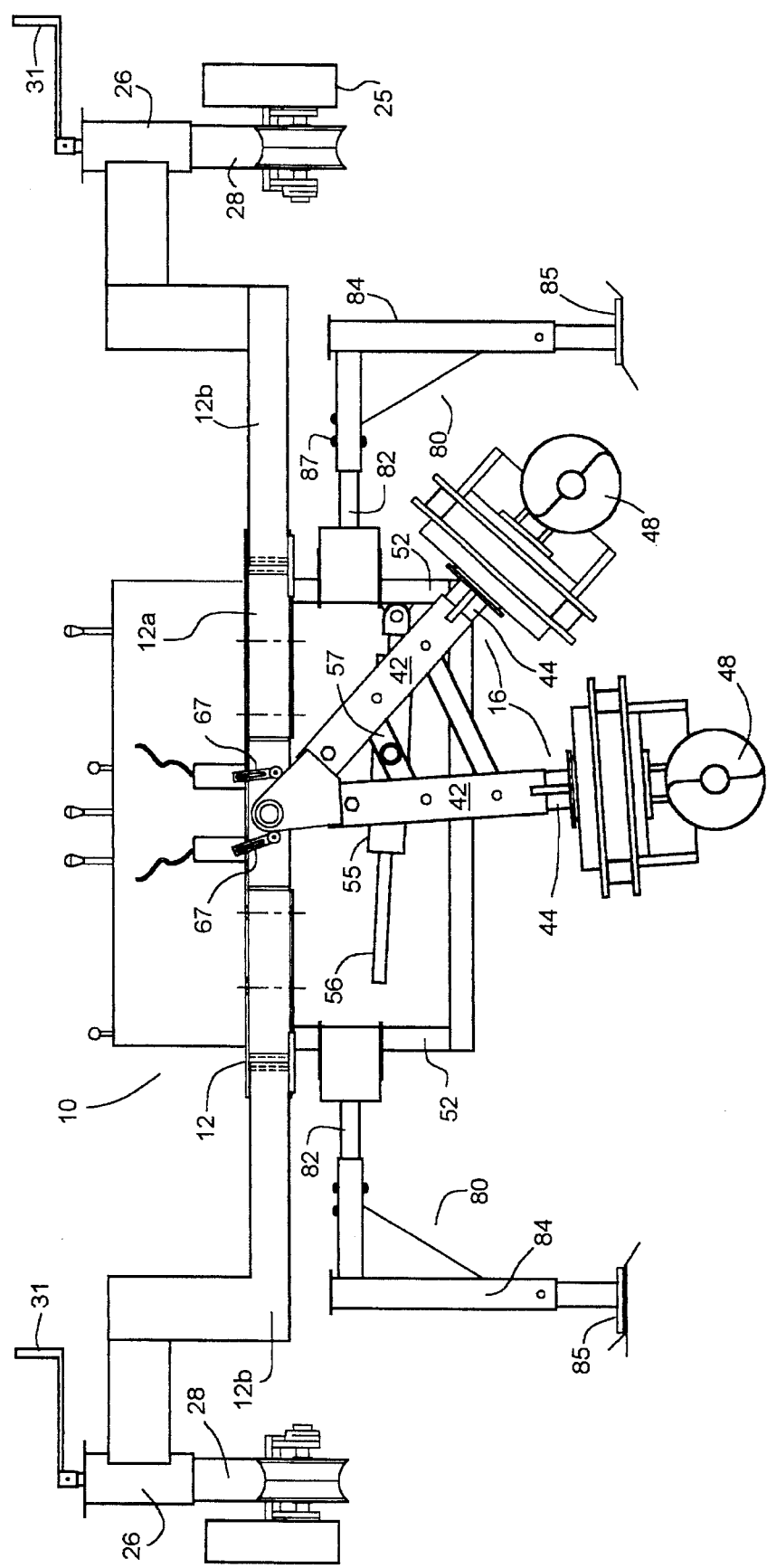
FIG. 5, is a view similar to FIG. 1 but showing certain parts disposed in a different operative position than that shown in FIG. 4.
Figure 10:
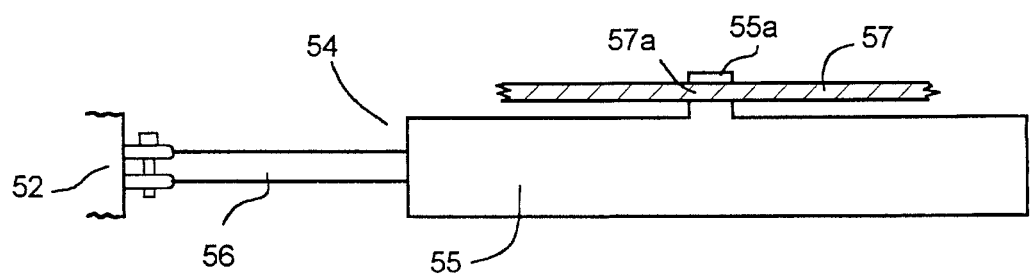
FIG. 10, is an enlarged top view of the anchoring of the hydraulic cylinder to the lower segment frame and the engagement of the cylinder with the finishing unit frame member in accordance with the present invention.

As shown in FIGS. 1–3, suspended below the central enlarged frame members 12*a* and 13*a* is a lower support frame member 52. The lower support frame member 52 extends downwardly from the central enlarged frame members 12*a* and 13*a* and supports a hydraulic cylinder 54 comprised of a cylinder 55 and piston 56, with the piston anchored to the support member 52 and the cylinder engageable with a finishing unit support member 57 extending between the outer support tubes 42. As shown in FIG. 10, the cylinder includes a projection 55*a* which is keyed to be received in an opening 57*a* in the support member 57. When the cylinder 55 and piston 56 are energized, the movement of the cylinder 55 with respect to the anchored piston results in the pivotal back and forth pendulum movement of the suspended finishing surfacing unit 16 thereby to move the same between the positions, as shown in FIGS. 4 and 5, to level and grade the concrete lining to the interior bottom surface of the drainage pipe 14.

Figure 11:
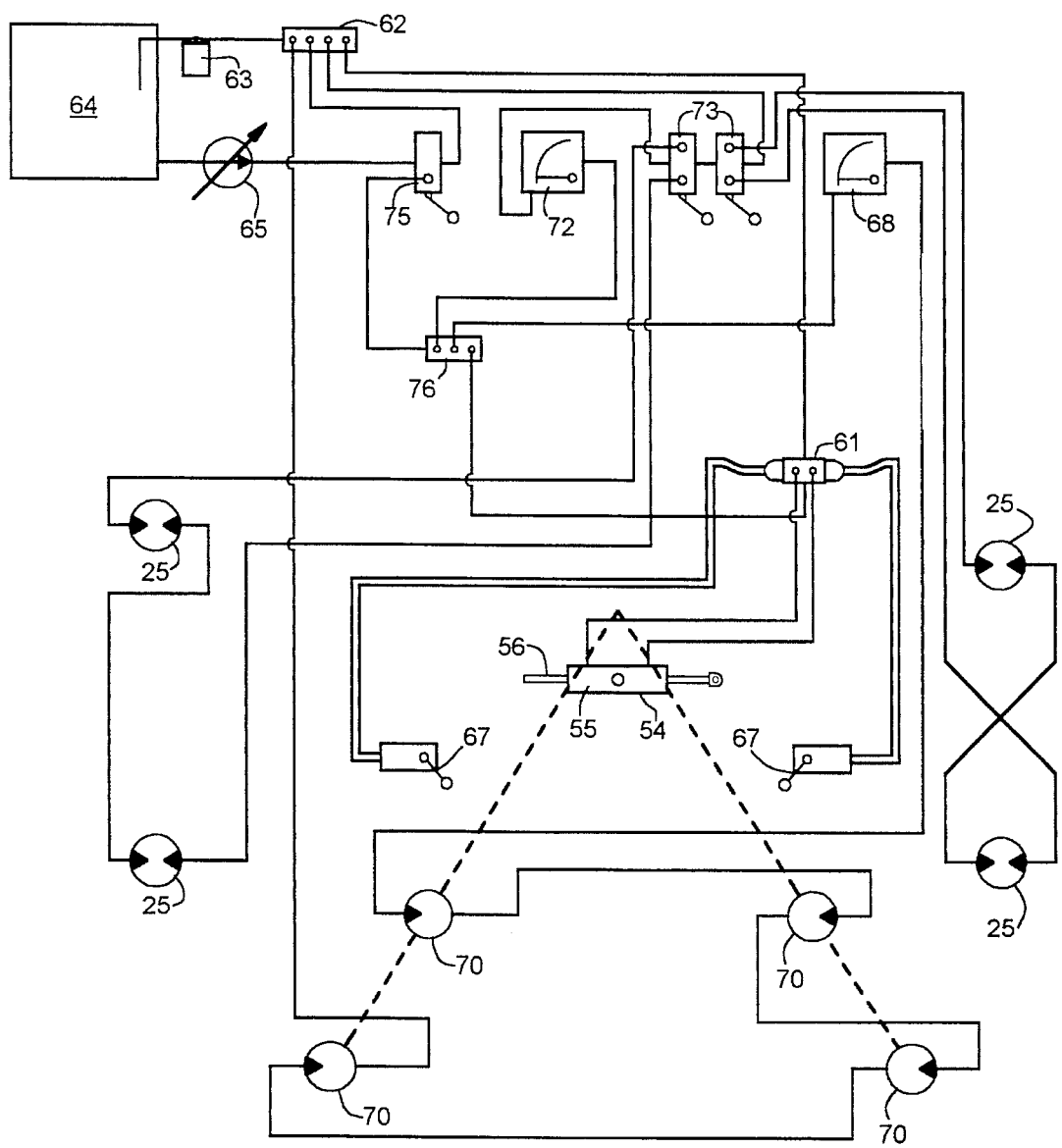
FIG. 11, is a diagram of the hydraulic circuitry showing the controls for the concrete leveling machine in accordance with the present invention.

The hydraulic circuitry is illustrated in FIG. 11 for the operation of the pipe paver finishing machine 10 and for operation of the suspended finishing surfacing unit in a pivotal back and forth pendulum movement to level and grade a concrete lining to the interior surface of the drainage pipe. The hydraulic cylinder 54 is connected to a solenoid operated stroke or control valve 61 which is operatively connected to a returned manifold 62 through a hydraulic oil filter 63 which cooperates with the hydraulic oil reservoir 64 to direct the fluid through a hydraulic pump 65 wherein the fluid may be directed through the control valve to move the cylinder 55 and the piston relative to one another, as desired. The solenoid operative stroke control valve 61 is operatively connected to a pair of stroke limit switches 67 which are mounted onto the central enlarged frame member 12*a* to straddle the bracket support member 37 such that upon the back and forth pivotal movement of the bracket support member and the suspended finishing unit 16, the engagement by the bracket support member with the stroke limiting switches 67 which automatically reverse the operation of the hydraulic cylinder 54 to result in the back and forth pendulum movement of the finishing unit, as shown in FIGS. 4 and 5. As shown in FIG. 7, the speed control valve 68 may be mounted onto the control console 17 to permit the operator of the pipe paver finishing machine to predeterminately control the speed of the augers 48 and the cylinders 46. Additionally, a speed control valve 72 operatively connected to a machine travel directional valves 73 which communicate with the machine tractive drive motors 25 predeterminately controls the pipe paving speed and travel of the pipe paving machine. An on-off paving valve 75 is operatively connected to an hydraulic pump 65 driven by electric motor 77 (FIG. 3) through a pressure manifold 76 for powering the leveling machine 10.

In FIGS. 1–7, the pipe paver finishing machine includes a plurality of edge forming ski assemblies 80 mounted to the corners of lower support frame member 52. The edge forming ski assembly 80 includes a support beam 82 anchored at the corners of the box like member 52 and extending outwardly therefrom which is adapted to engage a substantially L-shaped adjustable support bracket 84 for mounting the edge forming ski 85 to the finishing machine 10. The L-shaped support bracket includes an upper outer tubular member 86 which is slidably engageable with the support beam 82 and finally held thereto by bolts 87 or other fastening means to adjust the lateral displacement of the edge forming ski 85 with respect to the lower support frame member 52. The L-shaped support bracket 84 includes a lower extending tubular member 88 which is adapted to receive and hold by bolts 89 the edge forming ski member 85 to mount the same and to vertically adjust the edge forming ski 85 with respect to the desired profile of the poured and graded concrete liner 10*a*, as shown in FIG. 2.

The present invention contemplates a novel method of providing and finishing a uniform thickness of a concrete liner to a bottom interior segment portion of a drainage pipe. The method includes the first step of positioning a pipe paver finishing machine having a surfacing unit suspended from the machine within the drainage pipe. The surfacing unit is adapted for a back and forth pendulum-type pivotal movement within the drainage pipe. Secondly, the pivot point of the pendulum-type pivotal movement is located at the center of the drainage pipe. Next, the pipe paving machine is moved longitudinally along the interior of the drainage pipe while maintaining the pivot point of the pivotal movement at the center of the drainage pipe and engaging the surfacing unit with deposited concrete to grade and to finish a uniform thickness of concrete to a bottom interior segment portion of the drainage pipe.

The above described invention provides a novel pipe paver finishing machine having structure for laterally extending or contracting the width of the pipe paver leveling machine to adapt the same to various size diameters of pipes or conduits. Additionally, the novel and unique pipe paver finishing machine utilizes a surfacing finishing unit suspended from the chassis which is adapted for back and forth pendulum-type pivotal movement substantially about the center point of the drainage pipe to apply and finish a concrete liner onto the bottom interior surface of a lower segment portion of a drainage pipe.

I claim:

1. A concrete finishing machine for applying a concrete liner over the interior surface of a lower segment portion of a drainage pipe, including in combination:

a chassis-frame member adapted for movement longitudinally along the interior of the drainage pipe; and a surfacing unit suspended from said chassis-frame member and adapted for back and forth pendulum-type pivotal movement substantially about the center point and the vertical centerline of the drainage pipe, said surfacing unit comprised of a V-shaped downwardly extending leg structure adapted for said pivotal movement beyond said vertical centerline of said drainage pipe, with each of the legs thereof supporting a horizontally extending elongated concrete smoothing member, with said surfacing unit adapted to grade and to finish a concrete liner onto the bottom interior surface of a lower segment portion of the drainage pipe.

2. The concrete finishing machine in accordance with claim 1, wherein said back and forth pivotal movement of said surfacing unit is between about 75 to 125 degrees with respect to said lower segment portion of the drainage pipe.

3. The concrete finishing machine in accordance with claim 2, wherein said back and forth pivotal movement of said surfacing unit is about 90 degrees with respect to said lower segment portion of the drainage pipe.

4. The concrete finishing machine in accordance with claim 1, wherein said surfacing unit is comprised of at least one finishing roller.

5. The concrete finishing machine in accordance with claim 4, wherein said surfacing unit further includes an auger member positioned forwardly of said at least one finishing roller in substantially axial alignment thereto.

6. The concrete finishing machine in accordance with claim 1, further including means for moving said surfacing unit back and forth in a pendulum-type pivotal movement substantially about the center point of the drainage pipe.

7. The concrete finishing machine in accordance with claim 6, further including a control means for operatively actuating said means for moving said surfacing unit back and forth in a pendulum-type pivotal movement substantially about the center point of the drainage pipe.

8. The concrete finishing machine in accordance with claim 6, wherein said means for moving said surfacing unit includes a hydraulic actuated piston and cylinder unit.

9. The concrete finishing machine in accordance with claim 1, wherein said chassis-frame member is structurally arranged for lateral adjustment of the width of the chassis-frame member.

10. The concrete finishing machine in accordance with claim 1, wherein said chassis-frame member is structurally arranged for vertical adjustment to substantially maintain said pendulum-type pivotal movement of said surfacing unit on the center point of the drainage pipe.

11. The concrete finishing machine in accordance with claim 1, wherein said surfacing unit is structurally arranged for vertical adjustment to substantially maintain said pendulum-type pivotal movement of said surfacing unit on the center point of the drainage pipe to grade and to finish a concrete liner onto the bottom interior surface of a lower segment portion of the drainage pipe at a uniform depth.

12. The concrete finishing machine in accordance with claim 7, wherein said control means includes limit switch means which is engageable with said surfacing unit at the end of each pendulum-type pivotal movement to reverse the means for moving said surfacing unit.

* * * * *